United States Patent
Lee et al.

(10) Patent No.: US 9,154,856 B2
(45) Date of Patent: Oct. 6, 2015

(54) VIDEO SEGMENTING

(71) Applicant: Hewlett-Packard Development Company, L.P., Houston, TX (US)

(72) Inventors: Seungyon Lee, Sunnyvale, CA (US); Jerry J Liu, Cupertino, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 0 days.

(21) Appl. No.: 13/743,509

(22) Filed: Jan. 17, 2013

(65) Prior Publication Data

US 2014/0199045 A1    Jul. 17, 2014

(51) Int. Cl.
H04N 21/84    (2011.01)
H04N 5/783    (2006.01)
H04N 21/61    (2011.01)
H04N 21/845   (2011.01)
H04N 21/8543  (2011.01)
G11B 27/034   (2006.01)
G11B 27/10    (2006.01)
G11B 27/32    (2006.01)
H04N 5/765    (2006.01)
H04N 9/82     (2006.01)

(52) U.S. Cl.
CPC .............. H04N 21/84 (2013.01); G11B 27/034 (2013.01); G11B 27/105 (2013.01); G11B 27/329 (2013.01); H04N 5/783 (2013.01); H04N 21/6125 (2013.01); H04N 21/8456 (2013.01); H04N 21/8543 (2013.01); H04N 5/765 (2013.01); H04N 9/8205 (2013.01)

(58) Field of Classification Search
None
See application file for complete search history.

(56) References Cited

U.S. PATENT DOCUMENTS

| | | | |
|---|---|---|---|
| 7,143,353 B2 | 11/2006 | McGee et al. | |
| 8,200,063 B2 | 6/2012 | Chen et al. | |
| 8,239,418 B1 | 8/2012 | Baluja et al. | |
| 2002/0116392 A1* | 8/2002 | McGrath et al. | 707/104.1 |
| 2003/0093810 A1* | 5/2003 | Taniguchi | 725/112 |
| 2004/0263682 A1* | 12/2004 | Shinkai | 348/441 |
| 2007/0166013 A1* | 7/2007 | Yogeshwar et al. | 386/112 |
| 2008/0104521 A1* | 5/2008 | Dubinko et al. | 715/744 |
| 2008/0276289 A1* | 11/2008 | Stephanus van Ottele | 725/87 |
| 2011/0252055 A1* | 10/2011 | Cuzacq et al. | 707/770 |
| 2012/0128334 A1* | 5/2012 | Cheok et al. | 386/278 |

OTHER PUBLICATIONS

Video Metadata Key Strategic Importance for Online Video Publishers—Part 1 (Web Page), Nov. 6, 2008.
T. Xiang, et al. "Activity Based Surveillance Video Content Modelling", Department of Computer Science, University of London, pp. 1-35.
Y. Day, et al., "A Multi-level abstraction and modeling in video databases", (Research Paper), Journal Multimedia Systems—Special section on video libraries, Sep. 1999, pp. 409-423, vol. 7, Issue 5.
N. Korn, et al., "D-lib Magazine", (Web Page), Mar./Apr. 2011.

* cited by examiner

Primary Examiner — Hung Dang
Assistant Examiner — Sunghyoun Park
(74) Attorney, Agent, or Firm — Leffert & Polglaze

(57) ABSTRACT

Methods and apparatus for creating in-video objects for a video file include identifying a number of segments of the video file, creating a metadata file containing attributes of the segment for each of the segments, and creating a table of contents for the video content, the table of contents including visual representations of each of the segments.

15 Claims, 9 Drawing Sheets

VIDEO SEGMENTING

BACKGROUND

Video files that are published to a computer network, such as the internet, or world wide web, typically contains a description of the contents of the video and a title. Although video content is gaining growing popularity for entertainment, advertising, and education, what it allows to video users is still very limited. Unless a user manually watches or scans the video, there is no easy way to determine the actual content of a video. Watching a video by timeline or bookmarking the uniform resource locator (URL) for the whole video is typically the extent to which video may be collected or share.

DETAILED DESCRIPTION

Figure 1:
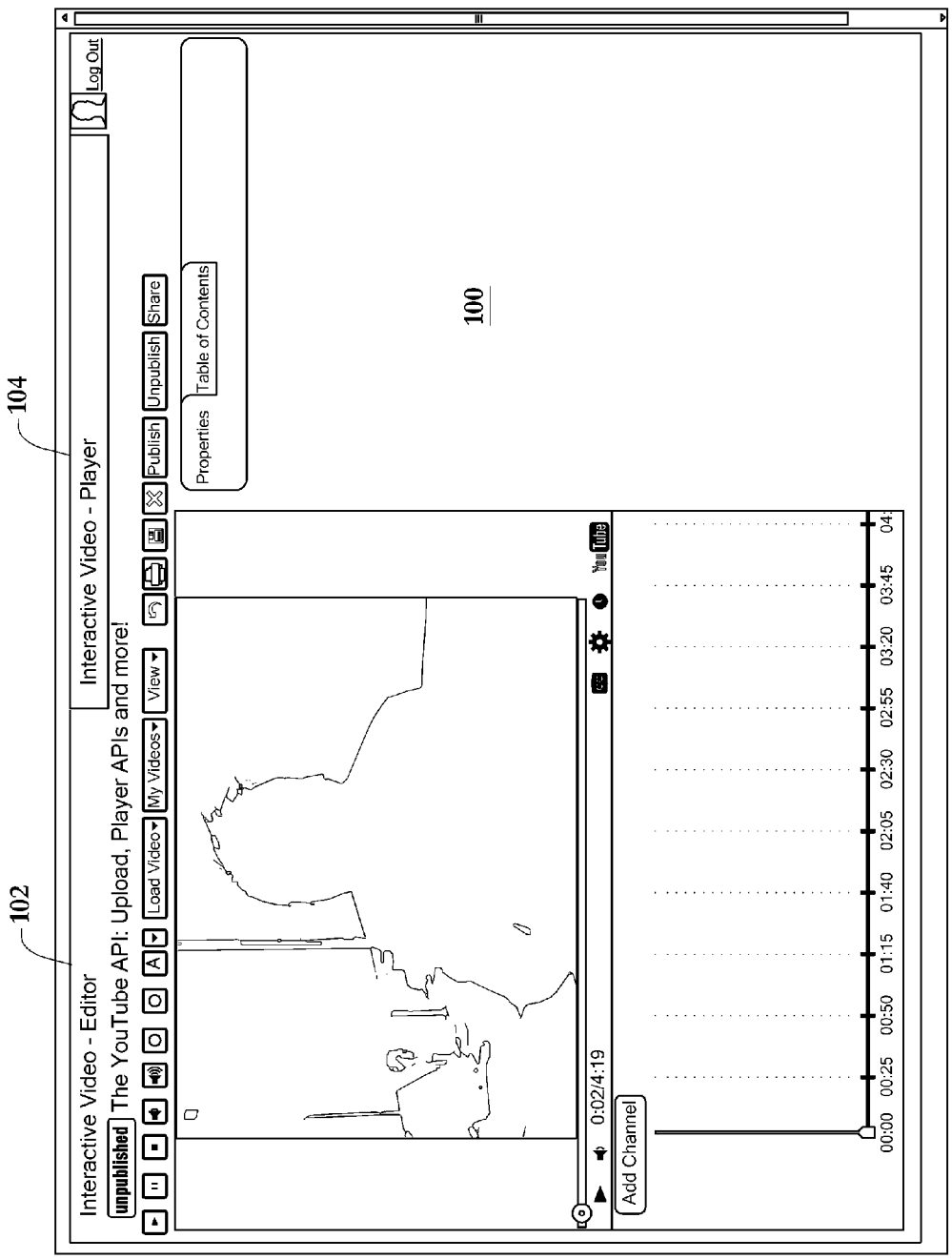
FIG. 1 shows an example of a graphical user interface (GUI) for marking existing video.

In the following detailed description of the present examples, reference is made to the accompanying drawings that form a part hereof, and in which is shown by way of illustration specific examples of the disclosure which may be practiced. These examples are described in sufficient detail to enable practice of the subject matter of the disclosure, and it is to be understood that other examples may be utilized and that process, electrical or mechanical changes may be made without departing from the scope of the present disclosure. The following detailed description is, therefore, not to be taken in a limiting sense.

The present disclosure relates to the segmenting of video files based on any conceptual topic. Typically, video files, such as .avi or .mp4 files and the like, are considered as a single file. To find a portion of the single file, a viewer views the video content until desired content appears. If the viewer does not have sufficient time or patience to view the content of an entire video file, which may be many minutes long, the content desired may not be found. Additionally, there is no easy way to store or bookmark an exact scene location for future retrieval, since the video is typically considered as a single file.

In a video file, there is typically no way to transfer partial contents of the video file without cumbersome video editing tools. Furthermore, even edited video files can have very large file sizes. With the increase in cloud computing, such large files become unwieldy, and consume large amounts of storage space and bandwidth. Therefore, they can be slow to load, and costly in terms of bandwidth to view and download.

Producers of video files have, at best, limited information about video usage. For example, on file streaming sites, a total view count may be available for a video file. However, such total count does not inform the producer of whether the views of the video content were complete, that is, whether the entire video file was viewed, or whether a portion was viewed. Further, if a portion of the video has been viewed, there is no way for the producer to know which portion of the video was viewed. Nor does the producer have any idea of any sharing of the video, via the provision of a hyperlink or the like to others the viewer wanted to see the video. Instead, only limited information is available.

Video is not typically a printable media. Instead, a short description of a video is often provided at the location where the video is viewable by a user. However, such descriptions typically do not contain much information other than the general content of the video, and do not allow for a user to know exactly where in the video certain events occur, or the duration of those events, etc. . . . . .

Mashups are items that combine data, functionality, presentation, and the like from two or more sources into one aggregate object. Mashups are typically used to make existing data more usable or presentable, for example.

Examples of the present disclosure provide the ability for a producer of content to index a video file as a series of individual in-video objects, and to present the video with an overlay of metadata that parses the contents of the whole video into in-video objects. This is performed without affecting the underlying video file. In one example, the individual objects are identified by metadata in an extensible markup language (xml) file. The underlying video file is used as the basis for the xml files, but the files themselves contain pointers and other metadata to allow a user to select, copy, share, and otherwise use partial contents of videos. In a video, single objects may be only a few second in length. Presenting the video with metadata overlays for individual content segments allows users to jump directly to specific content, to clip and share that content, and to create mashups from clipped content. This is shown in greater detail in FIGS. 5-8.

One example of a graphical user interface (GUI) for marking existing video and for working with already tagged video is shown in FIG. 1. It should be understood that the functions of marking existing video and working with already marked video may be separated into different GUIs without departing from the disclosure. The GUI 100 has tabs for choosing video segmenting 102 or video playing 104. For working with already tagged video, 104 is selected. From the menu, a marked video may be selected.

Figure 2:
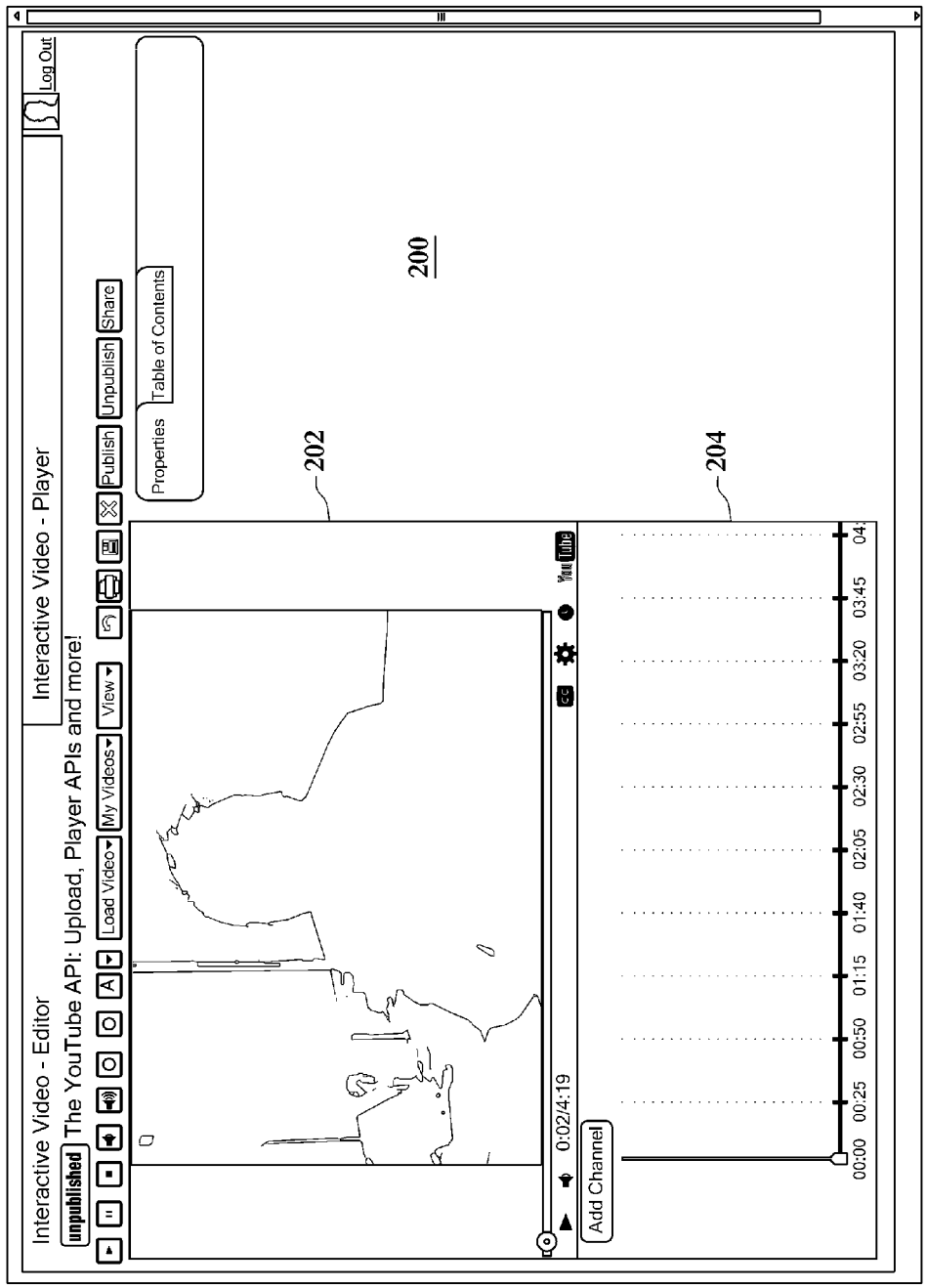
FIG. 2 shows an example of a graphical user interface for editing video.
Figure 3:
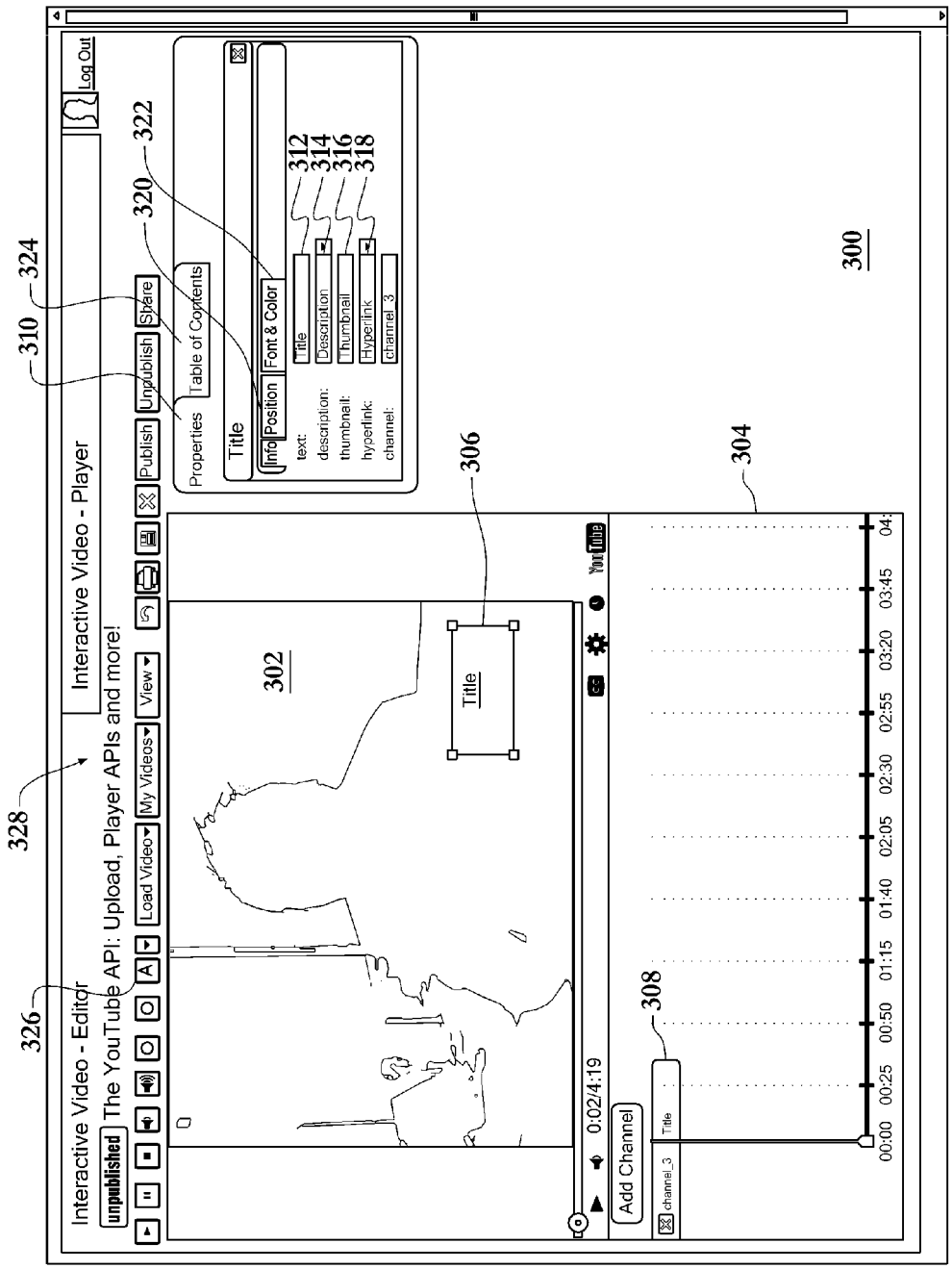
FIG. 3 shows a representation of creation of in-video objects according to an example of the present disclosure.

Segmenting video is started in one example using the tab 102 for interactive video segmenting. Choosing video segmenting opens a segmenting page 200 as shown in FIG. 2. A created video or externally saved video may be used for video segmenting. Once the video to be marked is selected, it is shown at 202, along with a timeline for the video at 204. The timeline shows where in a video the current image being played resides. Creating in-video objects is accomplished in one example by clicking or double clicking on the video 202, which opens a video-segmenting screen 300 as shown in FIG. 3.

In the video-segmenting operation, in-video objects are made in one example by selecting (e.g., by double-clicking with a mouse) on the video 302, which opens an in-video object creation operation with an anchor text box 306 and an associated selection box 308 for selecting the portion of the timeline 304 of the video 302 that is to be the in-video object.

The selection box 308 may be stretched to choose the time frame of the in-video object. The anchor text box 306 may be moved on the video screen to a location desired by the editor, and, for example, text, description, a hyperlink, and a visual identifier added to the box. This is done using a properties tab 310 allowing entry of information such as but not limited to text 312, description 314, visual identifier 316, and hyperlink 318. Other tabs on the properties window allow for manually changing position 320 and font and color 322 for the anchor text box. All the information added is in the form of metadata, and when saved, in one example, is saved in xml format. Other ways of creating an in-video object include double clicking on a channel if a channel exists in a timeline (such as timeline 204), or selecting the "A" button 326 on the toolbar 328 to create an anchor text box 306.

Metadata stored in an xml file for an in-video object or a mashup comprises in one example the following, although additional or fewer categories could be used without departing from the disclosure: data type, object title, color, font, start time, end time, description, hyperlink such as to relevant uniform resource locator (URL), thumbnail image or other visual identifier, location on video screen, size, key word highlight, author/creator of object or mashup.

Multiple in-video objects, each having their own associated times, ranges, and anchor text with metadata information may be created, each having its own set of properties. When the editor has finished each in-video object, it may be saved. Saving creates in one example an xml file containing the information entered in segmenting. This xml file is used to generate the table of contents entry for each in-video object.

As each in-video object is created, an individual xml file with all of its properties is saved. When each file is saved, a summary is also added to the table of contents for saved video content in the form of in-video objects, which is listed on table of contents tab 324. The visual table of contents is what is visible to a user when viewing the video with the interactive video player GUI. The jump and share features of the in-video objects created are visible and available for the user.

Publishers of video files desire additional information on how users view the content of video files, since traditionally, the only metric available for analysis is the number of times a video has been viewed. This provides very little information, as the publisher is unable to know what part or parts of a video have been viewed, whether the viewer watched the entire video or just portions, whether the viewer was at all engaged in the video, whether the video was shared with another, what portion or portions of the video may have been shared or otherwise identified, and the like. With videos having the additions described herein, however, analytics for use of the content of videos become available to the video producer.

For example, whenever content in the form of an in-video object is clipped, shared, viewed, that information is in one example stored and reported to the producer. User transactions are trackable. This allows the producer to determine which in-video objects were viewed, shared, clipped, used in mashups, and the like. With this information, the producer User transaction (click, navigate, clip, curate, share, print) is trackable to predict personal preference and behavior pattern.

Figure 4:
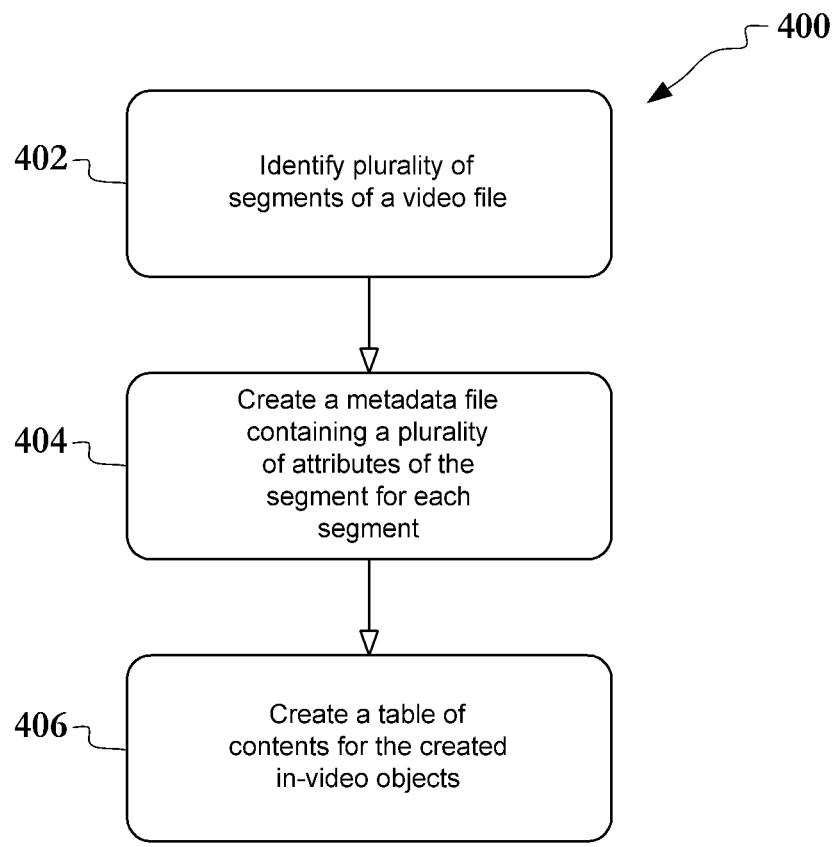
FIG. 4 is a flow chart diagram of a method according to yet another example of the present disclosure.

A method 400 of creating in-video objects for a video file is shown in FIG. 4. Method 400 comprises identifying a plurality of segments of the video file in block 402, creating a metadata file containing a plurality of attributes of the segment for each segment of the plurality of segments in block 404, and creating a table of contents for the created in-video objects in block 406. The table of contents comprises in one example visual representations of each of the plurality of segments.

In another example, information boxes corresponding to each of the segments are overlaid on the video content at a portion of the video content to which the segment pertains. The metadata file for a segment comprises in one example a title, an identifying image, and a description. It should be understood that additional or fewer pieces of information may be included in the metadata file without departing from the disclosure. Information in the metadata file may include by way of example only and not by way of limitation those elements listed above.

The information overlay boxes may be placed or positioned to be seen as a viewer watches the content, using the tools discussed above. To populate the metadata file for an in-video object, the editor may choose, for each of the segments, a series of entries for the information overlay box. The entries may be visible to a viewer, or not visible to a viewer, or a combination of visible and not visible. Such entries include by way of example only, and not by way of limitation, a start and end time for the segment of the content, a size and location on the content of the information overlay box, a title, a description, a visual identifier, a hyperlink, etc. . . . .

Figure 5:
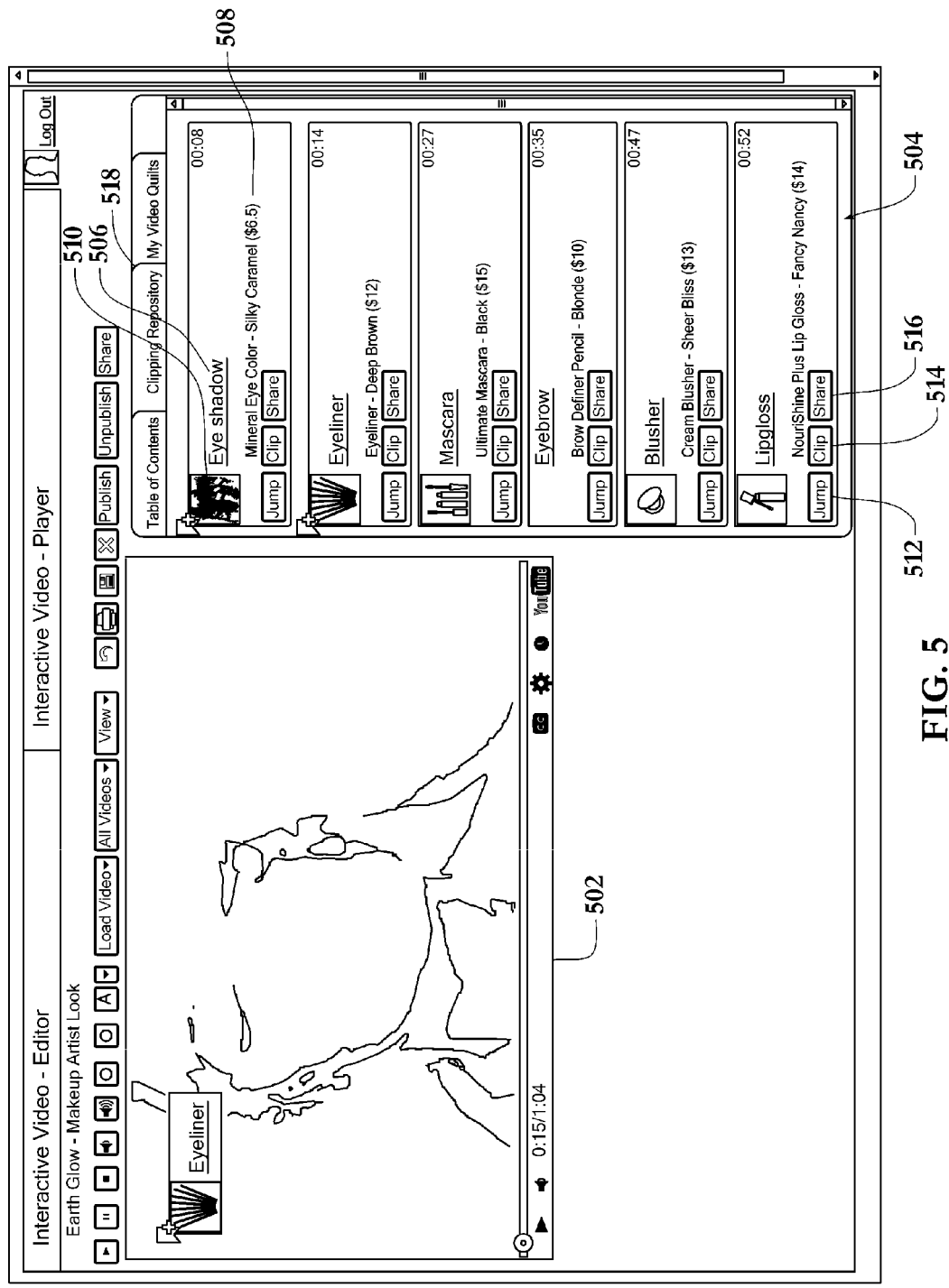
FIG. 5 shows a representation of a table of contents for a marked video according to an example of the present disclosure.

An example of a marked video content is shown in FIG. 5. The video file shows at 502. A video table of contents is shown at 504. The video table of contents shows the in-video objects that are present and marked in the video 502. Each individual in-video object has its own entry in the table of contents. For example, in FIG. 5, a video 502 has six individual in-video objects marked. Each in-video object has a title 506 which in one example is also a hyperlink, a description 508, and a visual identifier 510, although the information provided about the in-video objects may have fewer items, more items, and/or different items. What is common to each in-video object is a set of operation buttons, jump 512, clip 514, and share 516. Each option is described in further detail below.

The jump button 506, when selected, displays the video content for the selected in-video object segment, retrieving the metadata to allow the video file to be played at the particular time in the content, using the xml language associated with the entry. The underlying video file is not affected. Instead, selecting jump 512 retrieves stored xml information about the specific location in the video, and the location of the video itself, that allows the player 502 to display the selected video segment. When the jump button 506 is pressed, the video content is displayed at the position where the content is, and a metadata overlay box (see 610, FIG. 6) is displayed (see 306, FIG. 3). Clicking on the metadata overlay box (610) allows a user to clip the in-video object.

The clip button 514, when selected, retrieves the xml information from the selected in-video object and saves it to a user's clipping repository, identified at tab 518. The clipping repository is discussed further in FIG. 6.

The share button 516, when selected, generates a link or other identifier for the selected in-video object, such as, for example only and not by way of limitation, a uniform resource locator (URL), hyperlink, or the like. The link may then be posted to a social networking site, embedded to a blog, embedded in an email or other communication, or otherwise distributed. The shared information includes pointers from the xml file that allow the recipient to view the in-video object segment that has been identified. Interaction with the video content is on a segment by segment basis.

Figure 6:
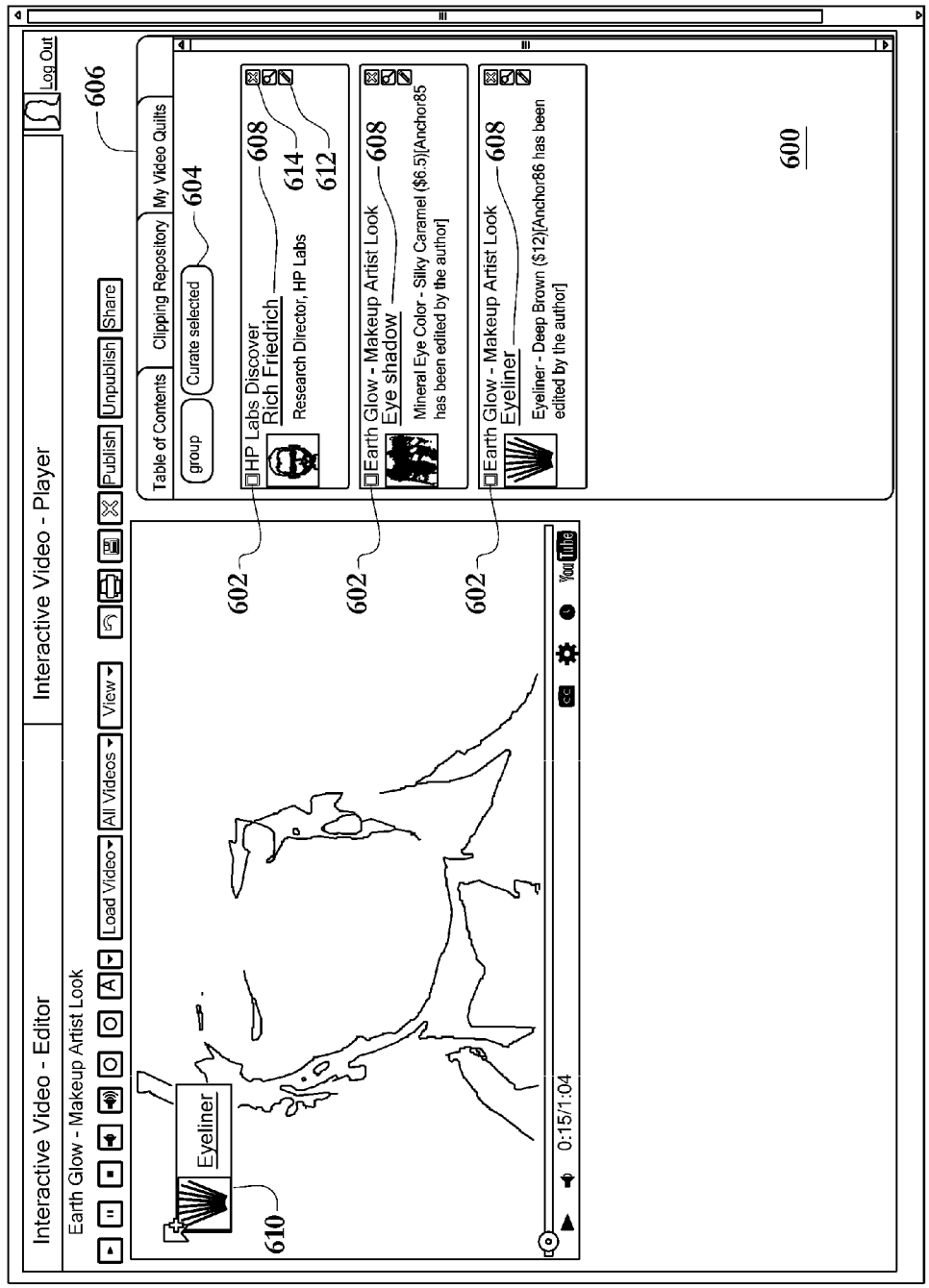
FIG. 6 shows a representation of a clipping repository according to an example of the present disclosure.

Referring now to FIG. 6, an example of a clipping repository 600 is shown. Clipping repository 600 contains a listing of all in-video object clips that a user has clipped, such as by using the clip button 514 discussed above. From the clipping repository 600, mashups of content from available clips may be made. For example, the clipping repository 600 in FIG. 6 has three clipped in-video objects. A clipping repository for a user contains all those in-video objects that the user has clipped from other videos. From this repository 600, a user can select individual objects to be combined in a mashup. This is done in one example by selecting the desired contents of a mashup using select boxes 602 for those video content segments to be included in the mashup. Once desired contents of a mashup are selected using the select boxes 602, a mashup of the selected in-video objects is performed by clicking a curate selected button 604. Curating in one example comprises combining a plurality of in-video objects into a mashup. Selecting button 604 creates a separate xml file containing the information for each of the selected in-video objects. This file is stored for the user, and is available in the my video quilts tab 606. The my video quilts tab is discussed further in FIG. 7.

Clicking on the title 608 of a clipped in-video object will display the content associated with the particular in-video object, regardless of the currently displayed video content. Clicking on the pencil button 612 on the right side of a clipped in-video object opens a text area to allow a user to leave a note for the object. Clicking the "X" button 614 on the right side of a clipped in-video object removes that object from the clipping repository.

Figure 7:
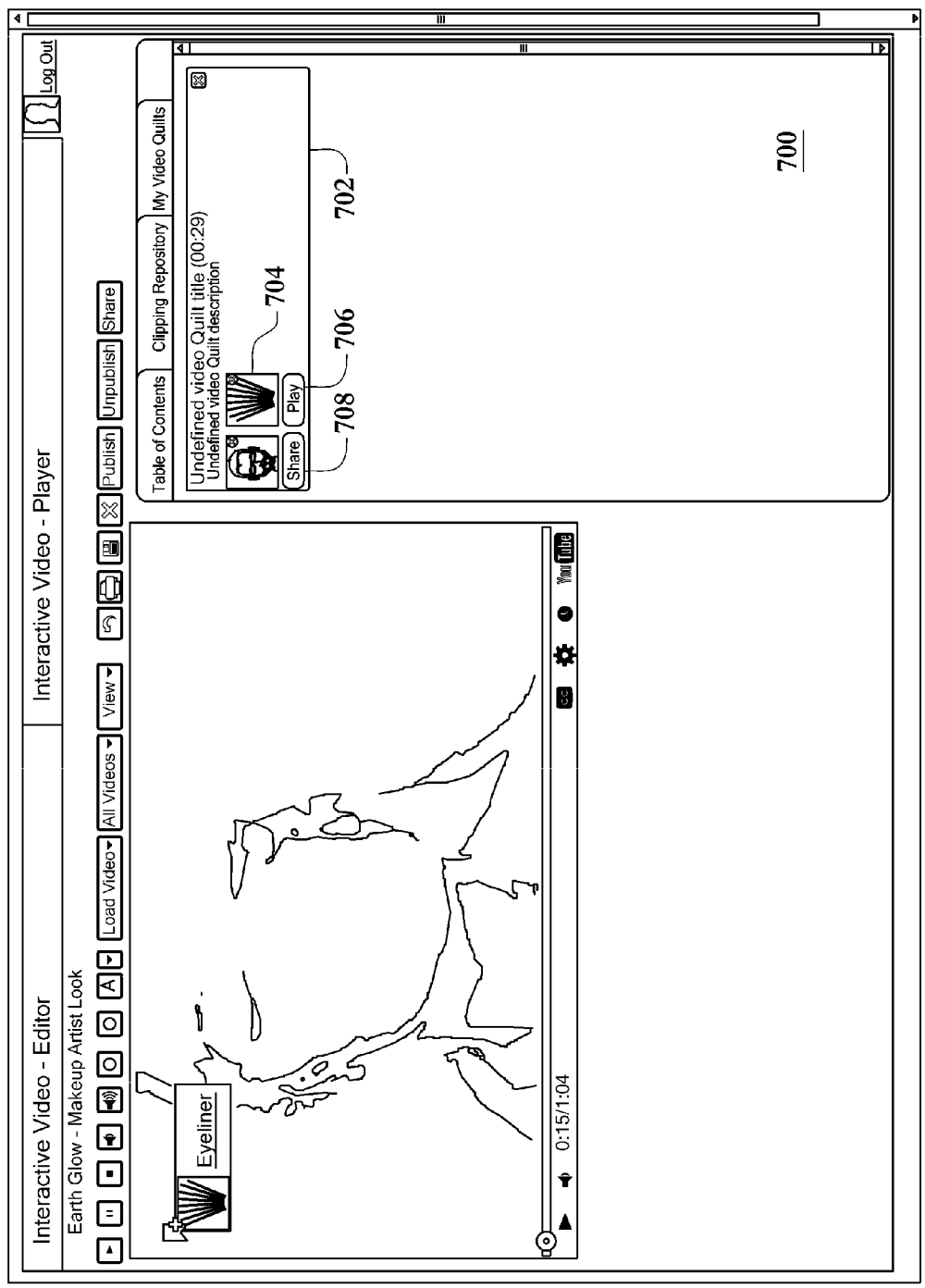
FIG. 7 shows a representation of a mashups screen according to an example of the present disclosure.

FIG. 7 shows a representative my video quilts tab screen 700. Each mashup (video quilt) that has been created by the user is available. FIG. 7 shows a single mashup 702. In one example, the visual identifiers 510 of the in-video objects that comprise the mashup are shown in the order they appear in the mashup, such as at 704. Each mashup may be played using a play button 706, or shared, similar to the sharing described above, using the share button 708. When a mashup is played, that mashup has a table of contents associated with it (not shown). The table of contents is generated as a part of the creation of the mashup.

The table of contents, which is a rough equivalent to a written summary of the in-video objects, allows a user, for example, to quickly see what video content is in the video file, to directly access the exact in-video object via a hyperlink, and to jump to the portion of the video that is represented by the in-video object. The table of contents is also print-friendly, as print-friendly content is available after a video is provided with in-video objects. Video content, in the form of in-video objects, can be converted to story board with text and image, table of contents with text, and/or photobook for images. The individual nature of the in-video objects allows tracking with much higher analytic value than tracking the number of views a video has.

Mashups and sharing of clipped or saved in-video object files, since they are all stored in xml format as metadata, and amenable to use in cloud computing, as the file sizes are small, and take little bandwidth when uploading and sharing.

Figure 8:
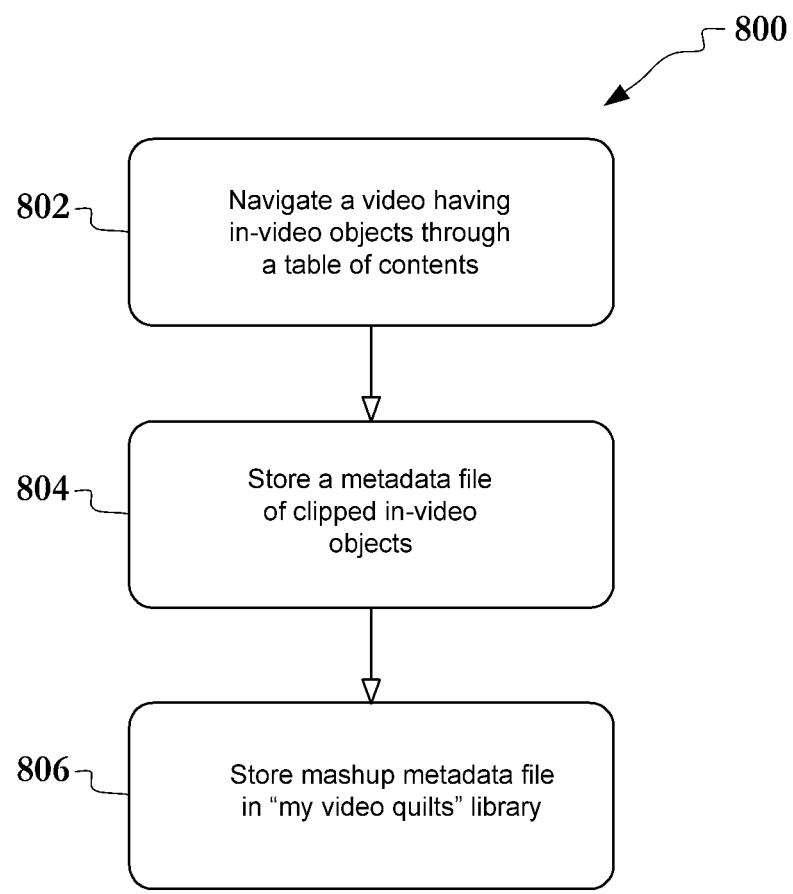
FIG. 8 is a flow chart diagram of a method according to another example of the present disclosure.

A method 800 of working with marked video is shown in FIG. 8. Method 800 comprises in one example navigating a video having in-video objects through a table of contents in block 802, clipping desired in-video objects in block 804, and storing a metadata file of clipped in-video objects in block 804. Once an in-video object, or multiple in-video objects, is stored, a user may play any of the in-video objects using the metadata file without affecting or storing any underlying video file. Further, a user may create mashups of content from more than one in-video object, and store and share those mashups, again without affecting or storing any underlying video file. When mashups are created (optionally), metadata files of the mashup attributes are stored and are available in the "my video quilts" library in block 806.

Implementations of FIGS. 1-8 of the present disclosure can be instantiated by machine-readable instructions, e.g., software, to cause a processor to perform methods disclosed herein. The machine-readable instructions can be stored on non-transitory computer-usable storage media in the form of volatile or non-volatile storage. Examples of storage media include solid-state memory (e.g., Read-Only Memory (ROM), Random-Access Memory (RAM), Flash memory, etc.); optical media (e.g., CD, DVD, Blu-Ray™ disks, etc.), magnetic media (e.g., magnetic disks and disk drives, magnetic tape, etc.). Such storage media may be a component part of a computer system, or it may include a removable storage medium.

Figure 9:
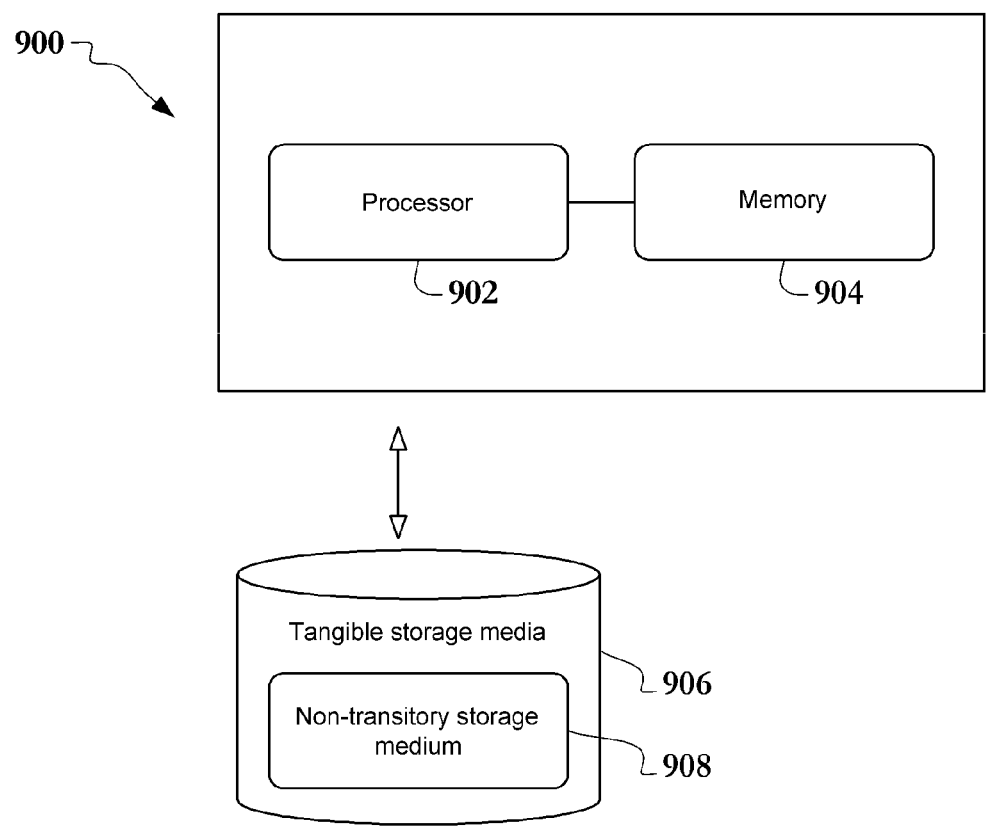
FIG. 9 is a block diagram of an example of a computer system for use with various implementations.

FIG. 9 is a block diagram of an example of a computer system 900 having a processor 902, physical memory 904 and a tangible storage media 906 in communication with the processor 902 for use with various implementations. The storage media 906 includes a non-transitory storage medium 908 and has machine-readable instructions stored thereon to cause the processor 902 to perform methods disclosed herein.

Segmenting video files with semantic modules, which enables clipping of in-video objects, allows a user to perform functions that are not currently available with video content. For example, the table of contents for a marked video may serve as a printable overview of the video. Also, the xml files containing metadata for clips and mashups are small, and are easily and quickly shared over computing networks. The marked videos allow for many analytics to determine use of videos.

Although specific examples have been illustrated and described herein it is manifestly intended that the scope of the claimed subject matter be limited only by the following claims and equivalents thereof.

What is claimed is:

1. A method, comprising:
  for an identified segment of a video file of a first file format, creating a metadata file of a second file format different than the first file format and containing an attribute of the segment; and
  creating a table of contents for the identified segment of the video file, the table of contents comprising a visual representation for the segment and a hyperlink configured to access the metadata file;
  wherein the metadata file contains metadata configured to access a particular position of the video file corresponding to the segment.

2. The method of claim 1, and further comprising:
  overlaying an information box corresponding to the segment on the video file at a portion of the video file to which the segment pertains.

3. The method of claim 1, wherein the metadata file for the segment further comprises at least one of: a title, an identifying image, and a description.

4. The method of claim 1, and further comprising:
  providing an overlay text box on the video for the in-video object when its associated segment is playing in the video.

5. The method of claim 1, wherein creating a metadata file further comprises:
  storing in the metadata file a start time and an end time of the segment; and
  populating the table of contents with a table of contents entry for at least one of a title, a description, a visual identifier, and a hyperlink for the segment.

6. The method of claim 5, and further comprising:
  tracking usage of the segment.

7. The method of claim 5, wherein the table of contents comprises a plurality of segments, and further comprising creating a mashup of a plurality of segments.

8. The method of claim 7, and further comprising:
storing the created mashup in a second metadata file comprising a combination of the metadata files for the plurality of segments; and
creating a table of contents for the created mashup.

9. The method of claim 5, wherein storing the metadata file comprises storing in an extensible markup language file format.

10. The method of claim 1, further comprising:
for one or more additional segments of the video file, creating corresponding additional metadata files of the second file format and each containing an attribute of its corresponding additional segment; and
creating a table of contents entry in the table of contents for each additional segment of the video file, each table of contents entry comprising a visual representation for its corresponding additional segment and a hyperlink configured to access its corresponding additional metadata file;
wherein each additional metadata file contains metadata configured to access a particular position of the video file corresponding to its corresponding additional segment.

11. A non-transitory computer-usable storage media having machine-readable instructions stored thereon to cause a processor to perform a method, the method comprising:
for an identified segment of a video file of a first file format, creating a metadata file of a second file format different than the first file format and containing an attribute of the segment; and
creating a table of contents for the video file, the table of contents comprising a visual representation for the segment and a hyperlink configured to access the metadata file;
wherein the metadata file contains metadata configured to access a particular position of the video file corresponding to the segment.

12. The non-transitory computer-usable storage media of claim 11, and further comprising:
overlaying an information box corresponding to the segment on the video file at a portion of the video file to which the segment pertains.

13. The non-transitory computer-usable storage media of claim 11, wherein the metadata file for the segment comprises at least one of: a title, an identifying image, and a description.

14. The non-transitory computer-usable storage media of claim 11, wherein creating a metadata file further comprises:
storing in the metadata file a start time and an end time of the segment; and
populating the table of contents with a table of contents entry for at least one of a title, a description, a visual identifier, and a hyperlink for the segment.

15. A system, comprising:
a processor;
a memory in communication with the processor; and
a non-transitory storage media in communication with the processor and the memory, the non-transitory storage media having machine-readable instructions stored thereon to cause the processor to perform a method, the method comprising:
for an identified segment of a video file of a first file format, creating a metadata file of a second file format different than the first file format and containing an attribute of the segment; and
creating a table of contents for the video file, the table of contents comprising a visual representation for the segment and a hyperlink configured to access the metadata file;
wherein the metadata file contains metadata configured to access a particular position of the video file corresponding to the segment.

* * * * *